3926X
N. Safford.
No Printed Specification Available
Straw Cutter.
Patented Aug. 25, 1824.
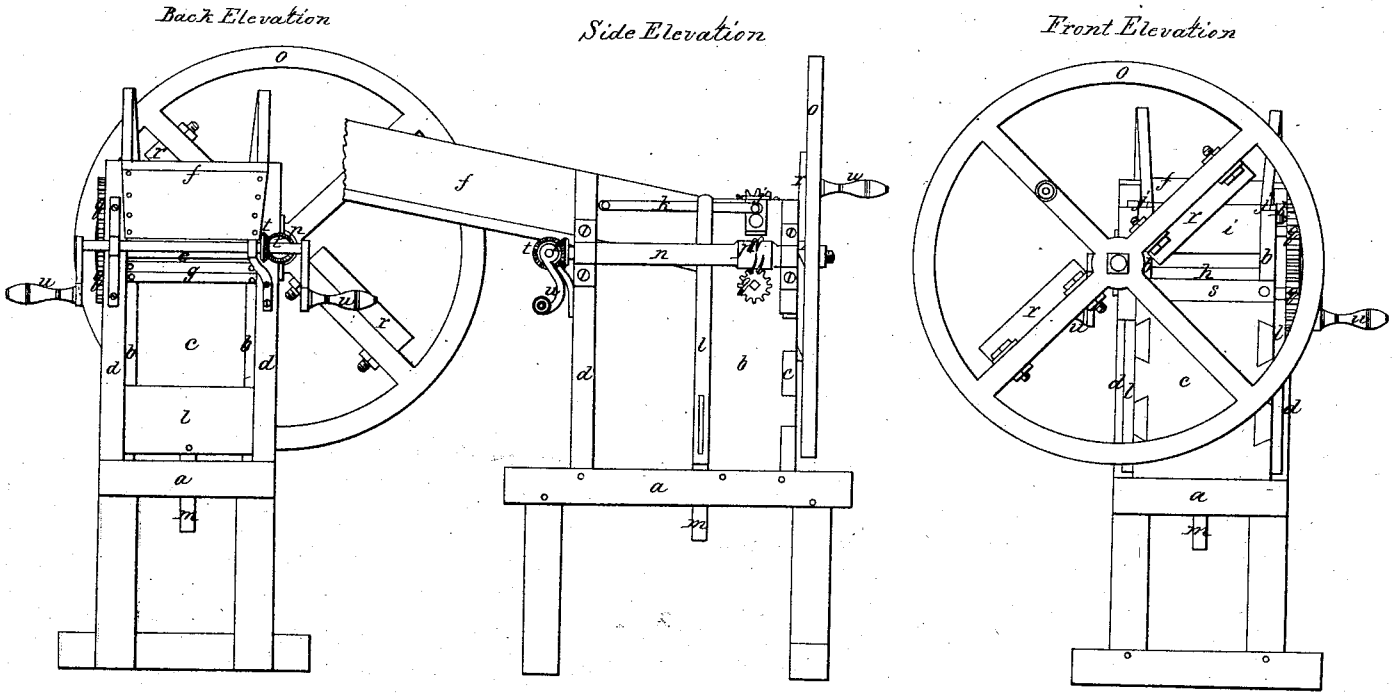

MISSING PAGE TEMPORARY NOTICE

PATENT # 3926X FOR ISSUE DATE 8-25-1824

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text